(12) United States Patent
Ji

(10) Patent No.: US 11,768,805 B2
(45) Date of Patent: Sep. 26, 2023

(54) MASS FILE RETRIEVAL METHOD AND APPARATUS BASED ON AI TRAINING PLATFORM, AND DEVICE

(71) Applicant: INSPUR SUZHOU INTELLIGENT TECHNOLOGY CO., LTD., Jiangsu (CN)

(72) Inventor: Guiyang Ji, Jiangsu (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/011,514

(22) PCT Filed: Jul. 29, 2021

(86) PCT No.: PCT/CN2021/109217
§ 371 (c)(1),
(2) Date: Dec. 19, 2022

(87) PCT Pub. No.: WO2022/057460
PCT Pub. Date: Mar. 24, 2022

(65) Prior Publication Data
US 2023/0214356 A1    Jul. 6, 2023

(30) Foreign Application Priority Data
Sep. 18, 2020 (CN) .......................... 202010988313.8

(51) Int. Cl.
*G06F 16/14* (2019.01)
*G06N 20/00* (2019.01)
*G06F 16/13* (2019.01)

(52) U.S. Cl.
CPC .......... *G06F 16/148* (2019.01); *G06F 16/134* (2019.01); *G06N 20/00* (2019.01)

(58) Field of Classification Search
CPC ...... G06F 16/248; G06F 16/285; G06F 16/93; G06F 16/3329; G06F 16/10; G06F 16/13;
(Continued)

(56) References Cited

U.S. PATENT DOCUMENTS

2019/0156032 A1    5/2019 Coroiu et al.
2019/0236178 A1    8/2019 Jagota et al.
(Continued)

FOREIGN PATENT DOCUMENTS

CN    102456055 A    5/2012
CN    105117502 A    12/2015
(Continued)

OTHER PUBLICATIONS

PCT/CN2021/109217 international search report.

*Primary Examiner* — Hau H Hoang
(74) *Attorney, Agent, or Firm* — IPRO, PLLC

(57) ABSTRACT

A mass file retrieval method and apparatus based on an AI training platform, and a device. The method includes: an AI training platform acquiring a retrieval task issued by a user, the AI training platform generating a retrieval thread flow according to the retrieval task, and controlling a service logic of a retrieval process according to the retrieval thread flow; and the AI training platform, performing sequential encoding on files in a database in units of folders, generating ordered queue folders, extracting retrieval key words from the retrieval task, and performing keyword retrieval on each ordered queue folder by combining a binary search and depth-first traversal.

18 Claims, 3 Drawing Sheets

(58) Field of Classification Search
CPC ...... G06F 16/14; G06F 16/144; G06F 16/148; G06F 16/152
See application file for complete search history.

(56) References Cited

U.S. PATENT DOCUMENTS

2020/0159861 A1* 5/2020 Baeck ................. H04L 63/0876
2021/0224225 A1* 7/2021 Gao ..................... G06F 3/0643

FOREIGN PATENT DOCUMENTS

| CN | 111459886 A | 7/2020 |
| CN | 111949610 A | 11/2020 |

* cited by examiner

MASS FILE RETRIEVAL METHOD AND APPARATUS BASED ON AI TRAINING PLATFORM, AND DEVICE

The application claims the priority of the Chinese patent application filed on Sep. 18, 2020 before the CNIPA, China National Intellectual Property Administration with the application number of 202010988313.8 and the title of "MASS FILE RETRIEVAL METHOD AND APPARATUS BASED ON AI TRAINING PLATFORM, AND DEVICE", which is incorporated herein in its entirety by reference.

FIELD

The present disclosure belongs to the technical field of file retrieval and more particularly, to a mass file retrieval method and apparatus based on an AI training platform, and a device.

BACKGROUND

AI training platform, namely artificial intelligence training platform, is a platform for management and scheduling of CPU and GPU resources, model training, and task management.

With the vigorous development of artificial intelligence related industries, more and more researchers from scientific research enterprises and universities have higher and higher requirements for computing power. The AI training platform effectively meets the requirements for computing power of enterprises or scientific research institutions. One of the most important and basic functions of the AI training platform is file related manipulation. How to retrieve effective information from mass files becomes a common basic function for algorithm researchers. Specific file retrieval and fuzzy file retrieval are performed in a dataset or in a user directory, and the performance of mass file retrieval is related to the working efficiency of researchers using the AI training platform. Thus, how to improve the retrieval performance is an urgent problem to be solved.

At present, existing technologies involving file retrieval are mainly used for file management of various systems, etc., and the quantity size of the file differs greatly from the file quantity level of the AI training platform. Moreover, existing technologies have no exception of recursively looping through all files to perform fuzzy matching comparison, performing fuzzy matching search based on a relevant command find of the operating system linux, and setting up file distributed storage for large-scale dedicated file management, with performance depending on a large number of high-configuration devices such as hardware. These technologies are very backward for the AI training platform, and have no technology application scenario suitable for realizing the file retrieval function of the AI training platform.

At the same time, looping through all the files for fuzzy matching comparison not only takes a very long time, but also occupies a very large number of system resources of an underlying system, including CPU, etc. First, it is a terrible experience for a user to wait for a very long time, and if the size of file data reaches T level, the waiting time may drive the user crazy. Second, high consumption of system resources has a great impact on other services of a system platform, and may cause a system crash in the most dangerous case. For some retrieval that does not consider the system performance, such as fuzzy find, the wait time is much longer than recursive loop through. As a result, currently occupied resources are not released, and even the process of underlying resources is blocked.

There is also existing technology for mass file retrieval, but its practice is service-specific, that is, it only focuses on file manipulation, and generally may not involve other service functions. The existing technology relies too much on high-configuration resources such as hardware devices. The technology of setting up a distributed file management platform for distributed retrieval and search is only suitable for dealing with a single service, has little service support for the AI training platform, and is even undesirable, resulting in waste of resources.

In view of the above defects in the prior art, it is very necessary to provide a mass file retrieval method and apparatus based on an AI training platform, and a device.

SUMMARY

In order to solve the technical problems that an existing traversal retrieval method, file management method and method only supporting file manipulation are not suitable for an AI training platform, resulting waste of resources, the present disclosure provides a mass file retrieval method and apparatus based on an AI training platform, and a device.

In a first aspect, the present disclosure provides a mass file retrieval method based on an AI training platform. The method includes:

S1, acquiring, by the AI training platform, a retrieval task issued by a user;

S2, generating, by the AI training platform, a retrieval thread flow based on the retrieval task, and controlling service logic of a retrieval process based on the retrieval thread flow; and S3, performing, by the AI training platform, sequential encoding on files in a database in units of folders to generate ordered queue folders, extracting a retrieval keyword from the retrieval task, and performing keyword retrieval on each ordered queue folder by a combination of binary search and depth-first traversal.

In an embodiment of the present disclosure, step S1 includes:

S11, acquiring, by the AI training platform, a login token of the user; and

S12, receiving, by the AI training platform, the retrieval task issued by the user based on the token. It is ensured that the same token corresponds to one retrieval task.

In an embodiment of the present disclosure, step S2 includes:

S21, starting, by the AI training platform, a retrieval thread;

S22, determining, upon completion of each retrieval, whether a retrieval times threshold is met;

in response to the retrieval times threshold being met, performing step S23; and in response to the retrieval times threshold being not met, performing step S24;

S23, determining whether the retrieval task is completed;

in response to the retrieval task being completed, performing step S28; and in response to the retrieval task being not completed, performing step S25;

S24, continuing retrieval, and returning to step S22;

S25, returning retrieval content, pausing the retrieval, and determining whether a total retrieval duration exceeds a retrieval duration threshold;

in response to the total retrieval duration exceeding the retrieval duration threshold, performing step S26; and in response to the total retrieval duration not exceeding the retrieval duration threshold, performing step S27;

S26, determining that the retrieval times out, and ending the retrieval;

S27, waking up the retrieval, and returning to step S24; and

S28, returning the retrieval content, and ending the retrieval. The retrieval times are set, and on the condition that the retrieval times are met, a pause is needed. The retrieval continues if the retrieval task is not completed. In the case that the retrieval ends but the retrieval times are not met, an end mark is returned. The retrieval duration threshold is set to control a retrieval duration and pause time, so as to prevent the retrieval without interruption. The retrieval ends automatically in case of timeout. In the actual retrieval process, for the sake of speed, there is no long wait. Moreover, if the pause time is too long, the problem that threads are not released may be caused.

In an embodiment of the present disclosure, step S22 includes:

S221, determining, upon completion of each retrieval, whether there is a next retrieval task issued by a user with the same token;

in response to there being the next retrieval task issued by the user with the same token, performing step S222; and in response to there not being the next retrieval task issued by the user with the same token, performing step S224;

S222, interrupting a current retrieval task thread, and performing operations based on a type of the next retrieval task;

S223, determining whether an interruption of the current retrieval task thread times out;

in response to the interruption of the current retrieval task thread timing out, determining that a retrieval interruption times out, and ending the retrieval; and in response to the interruption of the current retrieval task thread not timing out, waiting for completion of the next retrieval task, and returning to step S223; and S224, determining whether the retrieval times threshold is met;

in response to the retrieval times threshold being met, performing step S23; and in response to the retrieval times threshold being not met, performing step S24. The same token may only correspond to one retrieval task. On the condition that there is the next retrieval task issued by the user with the same token, the current retrieval task thread needs to be interrupted, and operations are performed according to the type of the next retrieval task. There is a limit to the interruption time of the current retrieval task, and the interrupted retrieval task stops in the case of timeout.

In an embodiment of the present disclosure, step S222 includes: determining the type of the next retrieval task;

in response to the type of the next retrieval task being a covering retrieval, regarding the next retrieval task as a new retrieval task, and returning to step S21;

in response to the type of the next retrieval task being a queued retrieval, setting the next retrieval task to a wait queue, and performing step S24;

in response to the type of the next retrieval task being a pause retrieval, performing step S25;

in response to the type of the next retrieval task being a continued retrieval, performing step S24;

in response to the type of the next retrieval task being a terminate retrieval, performing step S28. Whether to overwrite the interrupted retrieval task is determined based on the type of the next retrieval task.

In an embodiment of the present disclosure, step S3 includes:

S31, performing, by the AI training platform, sequential encoding on the files in the database in units of folders by hash to generate incremental or decremental queue folders;

S32, extracting, by the AI training platform, the retrieval keyword from the retrieval task, and locating a queue folder;

S33, determining, by the AI training platform, a traversal depth based on the retrieval keyword and a located queue folder before traversal retrieval, and determining a traversal path by binary search based on the traversal depth;

S34, performing, by the AI training platform, the traversal retrieval in the located queue folder along the traversal path, and determining, upon completion of the traversal retrieval, whether all the queue folders are traversed;

in response to all the queue folders being traversed, performing step S35; and in response to not all the queue folders being traversed, locating to a next queue folder, and returning to step S33; and S35, returning the retrieval content, and ending the retrieval. Sequential encoding is the basis of the subsequent binary search, thus ensuring that subsequent retrieval is performed in a jumping mode during the search, that is, bisearch is performed according to the ordered queue. On the condition that a searched object is smaller than a middle object of the queue, the search range is narrowed to the first half, otherwise the search range is located to the second half. Since a balanced binary tree or B+ tree needs to build indexes and maintain a large number of indexes, and performance costs are not suitable for the AI training platform, the more efficient balanced binary tree or B+ tree is not used for search. Therefore, the present disclosure uses binary search to determine the traversal path. Sequential encoding is performed on files in the same folder with the units of folders instead of encoding with the units of all files, so as to prevent the situation that there are too many files and the queue is too large to maintain.

In an embodiment of the present disclosure, step S33 includes:

S331, acquiring, by the AI training platform, a type of the retrieval keyword;

S332, determining, by the AI training platform, the traversal depth based on the type of the retrieval keyword and content of the located queue folder;

S333, determining, by the AI training platform, all sequential file nodes at a level of the traversal depth in the located queue folder, and determining a locating head node and a locating tail node based on an incremental or decremental order of the file nodes;

S334, calculating, by the AI training platform, a positioning middle node based on the locating head node and the locating tail node; and S335, determining, by the AI training platform, a new locating head node and locating tail node based on the incremental or decremental order of the file nodes, and calculating a new locating middle node until a traversal path is set in file nodes with the same traversal depth. Binary search realizes skip retrieval, greatly narrowing the retrieval range.

In an embodiment of the present disclosure, on the condition that in step S331, the type of the retrieval keyword is a folder keyword;

in step S332, the AI training platform determines the traversal depth based on attributes of the folder keyword and the content of the located queue folder; and in step S333, on the condition that the content of the located queue file has inconsistent attributes, the AI training platform establishes the traversal path with folder nodes in the same traversal depth, and ignores the file nodes in the same traversal depth; and on the condition that in step S331, the type of the retrieval keyword is a file keyword, in step S332, the AI training platform determines the traversal depth based on attributes of the file keyword and the content of the located queue folder; and in step S333, on the condition that the content of the located queue files has inconsistent attributes, the AI training platform establishes the traversal path with file nodes in the same traversal depth, and for folder nodes in the same traversal depth, step S332 is performed to continue to determine a traversal depth.

In a second aspect, the present disclosure provides a mass file retrieval apparatus based on an AI training platform. The apparatus includes:

a retrieval task acquisition module, configured to set the AI training platform to acquire a retrieval task issued by a user;

a retrieval thread flow setting module, configured to set the AI training platform to generate a retrieval thread flow based on the retrieval task, and control service logic of a retrieval process based on the retrieval thread flow; and a traversal retrieval module, configured to set the AI training platform to perform sequential encoding on files in a database in units of folders to generate ordered queue folders, extract a retrieval keyword from the retrieval task, and perform keyword retrieval on each ordered queue folder by a combination of binary search and depth-first traversal.

In a third aspect, the present disclosure further provides a device, including a processor and a memory. The memory is configured to store a computer program; and the processor is configured to call the computer program from the memory and run the computer program to cause the device to execute the above method in the first aspect.

The present disclosure has the following beneficial effects.

According to the mass file retrieval apparatus based on the AI training platform according to the present disclosure, the service logic of the retrieval process is controlled by the retrieval thread flow, so that the AI training platform is prevented from occupying the CPU of the server resources for a long time and reducing the resource utilization, and stable operation of the service of the AI training platform is ensured. At the same time, through the combination of depth-first traversal and binary search, the retrieval efficiency is improved, the defect of long retrieval time for files at the back caused by using depth-first traversal alone is avoided, the training time of the AI training platform is shortened, the efficiency of model training is improved, the mass file retrieval performance of the AI training platform is improved, and the competitiveness of the AI training platform is enhanced.

In addition, the present disclosure has reliable design principle, simple structure and very broad application prospects.

It may be seen that the present disclosure has prominent substantive features and significant progress compared with the prior art, and the beneficial effect of its implementation is also obvious.

BRIEF DESCRIPTION OF THE DRAWINGS

In order to more clearly explain the embodiments of the present disclosure or the technical solutions in the prior art, the following will briefly introduce the drawings needed in the embodiments or the prior technical description. It is obvious that for ordinary technicians in the art, other drawings may be obtained from these drawings without any creative effort.

Figure 1:
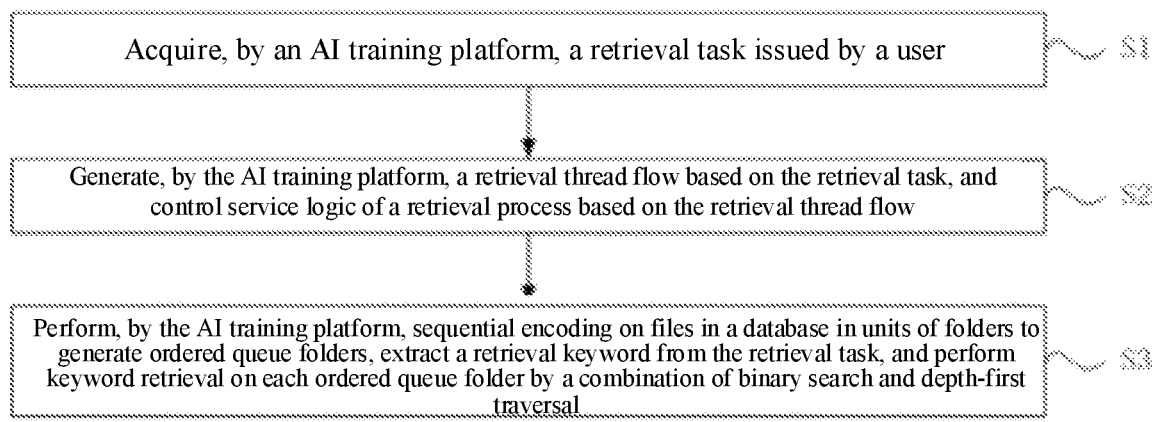
FIG. 1 is a first schematic flow diagram of a method according to the present disclosure.

In the drawings: 1—Retrieval task acquisition module; 1.1—Token acquisition unit; 1.2—Retrieval task acquisition unit; 2—Retrieval thread flow setting module; 2.1—Retrieval thread starting unit; 2.2—Retrieval times threshold determining unit; 2.3—Retrieval task completion determining unit; 2.4—Retrieval continuing unit; 2.5—Total retrieval duration determining unit; 2.6—Retrieval timeout determining unit; 2.7—Retrieval wakeup unit; 2.8—First retrieval content returning unit; 3—Traversal retrieval module; 3.1—Sequential encoding unit; 3.2—Queue folder locating unit; 3.3—Traversal path determining unit; 3.4—Traversal retrieval unit; 3.5—Queue folder relocating unit; and 3.6—Second retrieval content returning unit.

DETAILED DESCRIPTION

In order to enable people in the technical field to better understand the technical solutions in the present disclosure, the following will clearly and completely describe the technical solutions in the embodiments of the present disclosure in combination with the drawings in the embodiments of the present disclosure. Obviously, the described embodiments are only part of the embodiments of the present disclosure, not all of them. Based on the embodiments of the present disclosure, all other embodiments obtained by ordinary technicians in the art without doing creative work should belong to the scope of the present disclosure.

Example 1

As shown in FIG. 1, the present disclosure provides a mass file retrieval method based on an AI training platform. The method includes:

S1. Acquiring, by the AI training platform, a retrieval task issued by a user.

S2. Generating, by the AI training platform, a retrieval thread flow based on the retrieval task, and control service logic of a retrieval process based on the retrieval thread flow.

S3. Performing, by the AI training platform, sequential encoding on files in a database in units of folders to generate ordered queue folders, extract a retrieval keyword from the retrieval task, and perform keyword retrieval on each ordered queue folder by a combination of binary search and depth-first traversal.

Example 2

Figure 2:
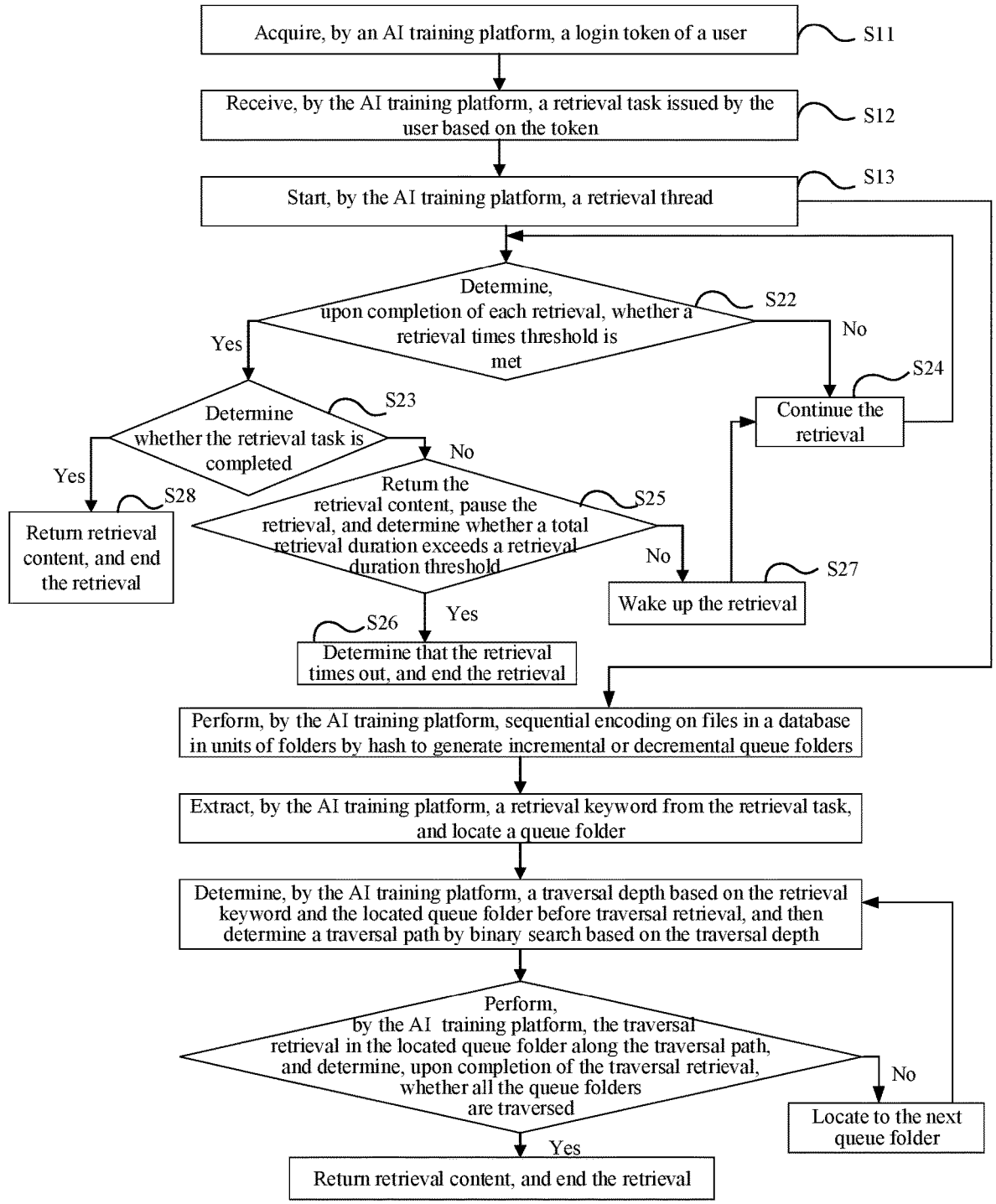
FIG. 2 is a second schematic flow diagram of a method according to the present disclosure.

As shown in FIG. 2, the present disclosure provides a mass file retrieval method based on an AI training platform. The method includes:

S1. Acquiring, by the AI training platform, a retrieval task issued by a user. S1 includes the following steps:

S11. Acquiring, by the AI training platform, a login token of the user.

S12. Receiving, by the AI training platform, the retrieval task issued by the user based on the token. It is ensured that the same token corresponds to one retrieval task.

S2. Generating, by the AI training platform, a retrieval thread flow based on the retrieval task, and control service logic of a retrieval process based on the retrieval thread flow. S2 includes:

S21. Starting, by the AI training platform, a retrieval thread.

S22. Determining, upon completion of each retrieval, whether a retrieval times threshold is met.

In response to the retrieval times threshold being met, performing step S23.

In response to the retrieval times threshold being not met, performing step S24.

S23. Determining whether the retrieval task is completed.

In response to the retrieval task being completed, performing step S28.

In response to the retrieval task being not completed, performing step S25.

S24. Continuing retrieval, and return to step S22.

S25. Returning retrieval content, pause the retrieval, and determine whether a total retrieval duration exceeds a retrieval duration threshold.

In response to the total retrieval duration exceeding the retrieval duration threshold, performing step S26.

In response to the total retrieval duration not exceeding the retrieval duration threshold, performing step S27.

S26. Determining that the retrieval times out, and ending the retrieval.

S27. Waking up the retrieval, and returning to step S24.

S28. Returning the retrieval content, and ending the retrieval.

The retrieval times are set, for example, requesting to retrieve pages fifty times. Upon retrieval of fifty items, a pause is needed. The retrieval continues if the retrieval task is not completed. In the case that the retrieval ends but fifty items are not met, an end mark is returned.

The retrieval duration threshold is set to control a retrieval duration and pause time, so as to prevent the retrieval without interruption. The retrieval ends automatically in case of timeout. In the actual retrieval process, for the sake of speed, there is no long wait. Moreover, if the pause time is too long, the problem that threads are not released may be caused. Sequential encoding is performed on files in the same folder with the units of folders instead of encoding all files, so as to prevent the situation that there are too many files and the queue is too large to maintain.

S3. Performing, by the AI training platform, sequential encoding on files in a database in units of folders to generate ordered queue folders, extracting a retrieval keyword from the retrieval task, and performing keyword retrieval on each ordered queue folder by a combination of binary search and depth-first traversal. S3 includes:

S31. Performing, by the AI training platform, sequential encoding on the files in the database in units of folders by hash to generate incremental or decremental queue folders.

S32. Extracting, by the AI training platform, the retrieval keyword from the retrieval task, and locating a queue folder.

S33. Determining, by the AI training platform, a traversal depth based on the retrieval keyword and the located queue folder before traversal retrieval, and determining a traversal path by binary search based on the traversal depth.

S34. Performing, by the AI training platform, the traversal retrieval in the located queue folder along the traversal path, and determining, upon completion of the traversal retrieval, whether all the queue folders are traversed.

In response to all the queue folders being traversed, performing step S35.

In response to not all the queue folders being traversed, locating to a next queue folder, and return to step S33.

S35. Returning the retrieval content, and ending the retrieval.

Sequential encoding is the basis of subsequent binary search, thus ensuring that subsequent retrieval is performed in a jumping mode during the search, that is, bisearch is performed according to the ordered queue. On the condition that a searched object is smaller than a middle object of the queue, the search range is narrowed to the first half, otherwise the search range is located to the second half. Since a balanced binary tree or B+ tree needs to build indexes and maintain a large number of indexes, and performance costs are not suitable for the AI training platform, the more efficient balanced binary tree or B+ tree is not used for search. Therefore, the present disclosure uses binary search to determine the traversal path.

In some examples, step S22 includes:

Z21. Determining, upon completion of each retrieval, whether there is a next retrieval task issued by a user with the same token.

In response to there being the next retrieval task issued by the user with the same token, performing step S222.

In response to there not being the next retrieval task issued by the user with the same token, performing step S224.

S222. Interrupting a current retrieval task thread, and perform operations based on a type of the next retrieval task.

S223. Determining whether an interruption of the current retrieval task thread times out.

In response to the interruption of the current retrieval task thread timing out, determining that a retrieval interruption times out, and ending the retrieval.

In response to the interruption of the current retrieval task thread not timing out, waiting for completion of the next retrieval task, and returning to step S223.

S224. Determining whether the retrieval times threshold is met;

In response to the retrieval times threshold being met, performing step S23.

In response to the retrieval times threshold being met, performing step S24. The same token may only correspond to one retrieval task. On the condition that there is the next retrieval task issued by the user with the same token, the current retrieval task thread needs to be interrupted, and operations are performed according to the type of the next retrieval task. There is a limit to the interruption time of the current retrieval task, and the interrupted retrieval task stops in the case of timeout. In some examples, step S222 includes: determining the type of the next retrieval task.

In response to the type of the next retrieval task being a covering retrieval, regarding the next retrieval task as a new retrieval task, and returning to step S21.

In response to the type of the next retrieval task being a queued retrieval, setting the next retrieval task to a wait queue, and performing step S24.

In response to the type of the next retrieval task being a pause retrieval, performing step S25.

In response to the type of the next retrieval task being a continued retrieval, performing step S24.

In response to the type of the next retrieval task being a terminate retrieval, performing step S28. Whether to overwrite the interrupted retrieval task is determined based on the type of the next retrieval task.

In some examples, step S33 includes:

S331. Acquiring, by the AI training platform, a type of the retrieval keyword.

S332. Determining, by the AI training platform, the traversal depth based on the type of the retrieval keyword and content of the located queue folder.

S333. Determining, by the AI training platform, all sequential file nodes at a level of the traversal depth in the located queue folder, and determining a locating head node and a locating tail node based on an incremental or decremental order of the file nodes.

S334. Calculating, by the AI training platform, a positioning middle node based on the locating head node and the locating tail node.

S335. Determining, by the AI training platform, a new locating head node and locating tail node based on the incremental or decremental order of the file nodes, and calculating a new locating middle node until a traversal path is set in file nodes with the same traversal depth. Binary search realizes skip retrieval, greatly narrowing the retrieval range.

In some examples, on the condition that in step S331, the type of the retrieval keyword is a folder keyword, for example, retrieving folders with certain keywords;

in step S332, the AI training platform determines the traversal depth based on attributes of the folder keyword and the content of the located queue folder; and in step S333, on the condition that the content of the located queue file has inconsistent attributes, for example, the located queue file has both folders and files, the AI training platform establishes the traversal path with folder nodes in the same traversal depth, and ignores the file nodes in the same traversal depth.

On the condition that in step S331, the type of the retrieval keyword is a file keyword, for example, retrieving files with certain suffixes;

in step S332, the AI training platform determines the traversal depth based on the attributes of the file keyword and the content of the located queue folder; and in step S333, on the condition that the content of the located queue files has inconsistent attributes, for example, the located queue file has both folders and files, the AI training platform establishes the traversal path with file nodes in the same traversal depth, and for folder nodes in the same traversal depth, step S332 is performed to continue to determine a traversal depth.

Example 3

Figure 3:
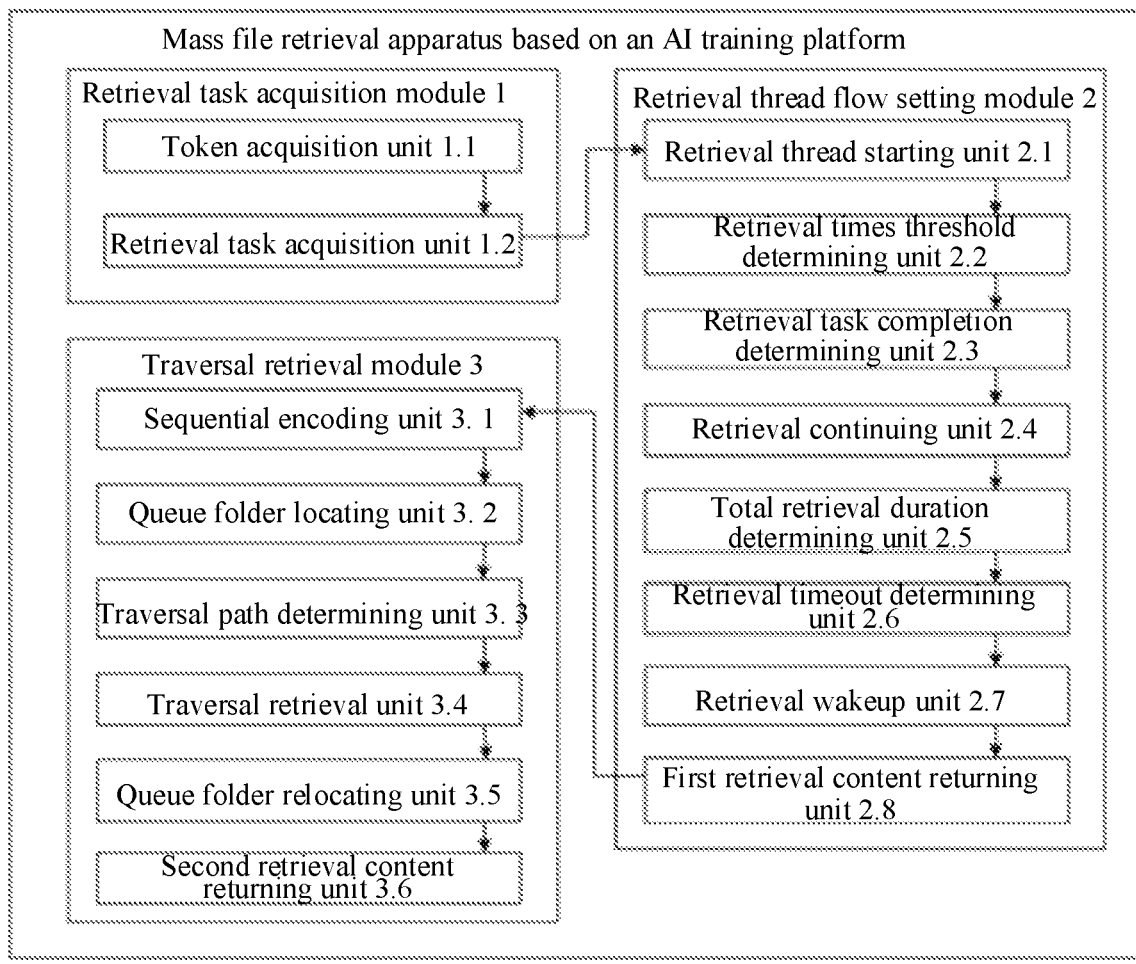
FIG. 3 is a schematic diagram of a system according to the present disclosure.

As shown in FIG. 3, the present disclosure provides a mass file retrieval apparatus based on an AI training platform. The apparatus includes:

a retrieval task acquisition module 1, configured to set the AI training platform to acquire a retrieval task issued by a user, the retrieval task acquisition module 1 including:

a token acquisition unit 1.1, configured to set the AI training platform to acquire a login token of the user; and a retrieval task acquisition unit 1.2, configured to set the AI training platform to acquire the retrieval task issued by the user based on the token;

a retrieval thread flow setting module 2, configured to set the AI training platform to generate a retrieval thread flow based on the retrieval task, and control service logic of a retrieval process based on the retrieval thread flow, the retrieval thread flow setting module 2 including:

a retrieval thread starting unit 2.1, configured to set the AI training platform to start a retrieval thread;

a retrieval times threshold determining unit 2.2, configured to determine, upon completion of each retrieval, whether a retrieval times threshold is met;

a retrieval task completion determining unit 2.3, configured to determine whether the retrieval task is completed on the condition that the retrieval times threshold is not met;

a retrieval continuing unit 2.4, configured to continue the retrieval on the condition that the retrieval times threshold is met;

a total retrieval duration determining unit 2.5, configured to return retrieval content, pause the retrieval, and determine whether a total retrieval duration exceeds a retrieval duration threshold on the condition that the retrieval times threshold is not met but the retrieval task is not completed;

a retrieval timeout determining unit 2.6, configured to determine that the retrieval times out and end the retrieval on the condition that the total retrieval duration exceeds the retrieval duration threshold;

a retrieval wakeup unit 2.7, configured to determine retrieval wakeup on the condition that the total retrieval duration does not exceed the retrieval duration threshold; and a first retrieval content returning unit 2.8, configured to return the retrieval content and end the retrieval on the condition that the retrieval times threshold is not met and the retrieval task is completed; and a traversal retrieval module 3, configured to set the AI training platform to perform sequential encoding on files in a database in units of folders to generate ordered queue folders, extract a retrieval keyword from the retrieval task, and perform keyword retrieval on each ordered queue folder by a combination of binary search and depth-first traversal, the traversal retrieval module 3 including:

a sequential encoding unit 3.1, configured to set the AI training platform to perform sequential encoding on the files in the database in units of folders by hash to generate incremental or decremental queue folders;

a queue folder locating unit 3.2, configured to set the AI training platform to extract the retrieval keyword from the retrieval task, and locate a queue folder;

a traversal path determining unit 3.3, configured to set the AI training platform to determine a traversal depth based on the retrieval keyword and the located queue folder before traversal retrieval, and then determine a traversal path by binary search based on the traversal depth;

a traversal retrieval unit 3.4, configured to set the AI training platform to perform the traversal retrieval in the located queue folder along the traversal path, and determine, upon completion of the traversal retrieval, whether all the queue folders are traversed;

a queue folder relocating unit 3.5, configured to locate to the next queue folder on the condition that there are queue folders that are not traversed; and a second retrieval content returning unit 3.6, configured to return the retrieval content, and end the retrieval on the condition that all the queue folders are traversed.

Example 4

The present disclosure provides a device including a processor and a memory. The memory is configured to store a computer program. The processor is configured to call the computer program from the memory and run the computer program to cause the device to execute the above operations in Example 1 or Example 2.

Although the present disclosure has been described in detail by referring to the accompanying drawings and combining with preferred embodiments, the present disclosure is not limited to this. Without departing from the spirit and essence of the present disclosure, ordinary technicians in the art may make various equivalent modifications or substitutions to the embodiments of the present disclosure, and these modifications or substitutions should be within the scope of the present disclosure/any technician familiar with the field of technology may easily think of changes or substitutions within the scope of the disclosure of the present disclosure, and should be covered in the scope of protection of the present disclosure. Therefore, the protection scope of the present disclosure shall be subject to the protection scope of the claims.

The invention claimed is:

1. A mass file retrieval method based on an artificial intelligence training platform, comprising:

S1, acquiring, by the artificial intelligence training platform, a retrieval task issued by a user;

S2, generating, by the artificial intelligence training platform, a retrieval thread flow based on the retrieval task, and controlling service logic of a retrieval process based on the retrieval thread flow; and S3, performing, by the artificial intelligence training platform, sequential encoding on files in a database in units of folders to generate ordered queue folders, extracting a retrieval keyword from the retrieval task, and performing keyword retrieval on each ordered queue folder by a combination of binary search and depth-first traversal, wherein step S2 comprises:

S21, starting, by the artificial intelligence training platform, a retrieval thread;

S22, determining, upon completion of each retrieval, whether a retrieval times threshold is met;

in response to the retrieval times threshold being met, performing step S23; and in response to the retrieval times threshold being not met, performing step S24;

S23, determining whether the retrieval task is completed;

in response to the retrieval task being completed, performing step S28; and in response to the retrieval task being not completed, performing step S25;

S24, continuing retrieval, and returning to step S22;

S25, returning retrieval content, pausing the retrieval, and determining whether a total retrieval duration exceeds a retrieval duration threshold;

in response to the total retrieval duration exceeding the retrieval duration threshold, performing step S26; and in response to the total retrieval duration not exceeding the retrieval duration threshold, performing step S27;

S26, determining that the retrieval times out, and ending the retrieval;

S27, waking up the retrieval, and returning to the step S24; and

S28, returning the retrieval content, and ending the retrieval.

2. The mass file retrieval method based on an artificial intelligence training platform according to claim 1, wherein step S1 comprises:

S11, acquiring, by the artificial intelligence training platform, a login token of the user; and S12, receiving, by the artificial intelligence training platform, the retrieval task issued by the user based on the token.

3. The mass file retrieval method based on an artificial intelligence training platform according to claim 2, wherein the step S22 comprises:

S221, determining, upon completion of each retrieval, whether there is a next retrieval task issued by a user with the same token;

in response to there being the next retrieval task issued by the user with the same token, performing step S222; and in response to there not being the next retrieval task issued by the user with the same token, performing step S224;

S222, interrupting a current retrieval task thread, and performing operations based on a type of the next retrieval task;

S223, determining whether an interruption of the current retrieval task thread times out;

in response to the interruption of the current retrieval task thread timing out, determining that a retrieval interruption times out, and ending the retrieval; and in response to the interruption of the current retrieval task thread not timing out, waiting for completion of the next retrieval task, and returning to step S223; and S224, determining whether the retrieval times threshold is met;

in response to the retrieval times threshold being met, performing the step S23; and in response to the retrieval times threshold being not met, performing the step S24.

4. The mass file retrieval method based on an artificial intelligence training platform according to claim 3, wherein the step S222 of interrupting a current retrieval task thread, and performing operations based on a type of the next retrieval task, comprises:

determining the type of the next retrieval task;

in response to the type of the next retrieval task being a covering retrieval, regarding the next retrieval task as a new retrieval task, and returning to step S21;

in response to the type of the next retrieval task being a queued retrieval, setting the next retrieval task to a wait queue, and performing the step S24;

in response to the type of the next retrieval task being a pause retrieval, performing the step S25;

in response to the type of the next retrieval task being a continued retrieval, performing the step S24; and in response to the type of the next retrieval task being a terminate retrieval, performing the step S28.

5. The mass file retrieval method based on an artificial intelligence training platform according to claim 3, wherein one token corresponds to one retrieval task.

6. The mass file retrieval method based on an artificial intelligence training platform according to claim 3, wherein the method further comprises:
determining whether to overwrite an interrupted retrieval task based on the type of the next retrieval task.

7. The mass file retrieval method based on an artificial intelligence training platform according to claim 1, wherein step S3 comprises:
S31, performing, by the artificial intelligence training platform, sequential encoding on the files in the database in units of folders by hash to generate incremental or decremental queue folders;
S32, extracting, by the artificial intelligence training platform, the retrieval keyword from the retrieval task, and locating a queue folder;
S33, determining, by the artificial intelligence training platform, a traversal depth based on the retrieval keyword and a located queue folder before traversal retrieval, and determining a traversal path by binary search based on the traversal depth;
S34, performing, by the artificial intelligence training platform, the traversal retrieval in the located queue folder along the traversal path, and determining, upon completion of the traversal retrieval, whether all the queue folders are traversed;
in response to all the queue folders being traversed, performing step S35; and
in response to not all the queue folders being traversed, locating to a next queue folder, and returning to step S33; and
S35, returning the retrieval content, and ending the retrieval.

8. The mass file retrieval method based on an artificial intelligence training platform according to claim 7, wherein the step S33 comprises:
S331, acquiring, by the artificial intelligence training platform, a type of the retrieval keywords;
S332, determining, by the artificial intelligence training platform, the traversal depth based on the type of the retrieval keywords and content of the located queue folder;
S333, determining, by the artificial intelligence training platform, all sequential file nodes at a level of the traversal depth in the located queue folder, and determining a locating head node and a locating tail node based on an incremental or decremental order of the file nodes;
S334, calculating, by the artificial intelligence training platform, a positioning middle node based on the locating head node and the locating tail node; and
S335, determining, by the artificial intelligence training platform, a new locating head node and locating tail node based on the incremental or decremental order of the file nodes, and calculating a new locating middle node until a traversal path is set in file nodes with the same traversal depth.

9. The mass file retrieval method based on an artificial intelligence training platform according to claim 8, wherein on the condition that in step S331, the type of the retrieval keyword is a folder keyword;
in step S332, the artificial intelligence training platform determines the traversal depth based on attributes of the folder keyword and the content of the located queue folder; and
in step S333, on the condition that the content of the located queue file has inconsistent attributes, the artificial intelligence training platform establishes the traversal path with folder nodes in the same traversal depth, and ignores the file nodes in the same traversal depth; and
on the condition that in the step S331, the type of the retrieval keyword is a file keyword;
in the step S332, the artificial intelligence training platform determines the traversal depth based on attributes of the file keyword and the content of the located queue folder; and
in the step S333, on the condition that the content of the located queue files has inconsistent attributes, the artificial intelligence training platform establishes the traversal path with file nodes in the same traversal depth, and for folder nodes in the same traversal depth, the step S332 is performed to continue to determine a traversal depth.

10. The mass file retrieval method based on an artificial intelligence training platform according to claim 1, wherein the retrieval duration threshold is set to control a retrieval duration and pause time, to prevent the retrieval without interruption.

11. The mass file retrieval method based on an artificial intelligence training platform according to claim 1, wherein the retrieval is performed in a jumping mode during the binary search.

12. The mass file retrieval method based on an artificial intelligence training platform according to claim 11, wherein the binary search is performed according to the ordered queue;
on the condition that a searched object is smaller than a middle object of the queue, a search range is narrowed to a first half;
on the condition that the searched object is not smaller than the middle object of the queue, the search range is located to a second half.

13. A non-transitory computer-readable storage medium, storing a data backup computer program thereon, when executed by a processor, causes the processor to implement the operations according to claim 1.

14. A device, comprising a processor and a memory, wherein the memory is configured to store a computer program executable on the processor; and when the computer program is executed by the processor, causes the processor to perform:
S1 of setting the artificial intelligence training platform to acquire a retrieval task issued by a user;
S2 of setting the artificial intelligence training platform to generate a retrieval thread flow based on the retrieval task, and control service logic of a retrieval process based on the retrieval thread flow; and
S3 of setting the artificial intelligence training platform to perform sequential encoding on files in a database in units of folders to generate ordered queue folders, extract a retrieval keyword from the retrieval task, and perform keyword retrieval on each ordered queue folder by combining a binary search and depth-first traversal,
wherein step S2 of setting the artificial intelligence training platform to generate a retrieval thread flow based on the retrieval task, and control service logic of a retrieval process based on the retrieval thread flow, comprises:
S21, starting, by the artificial intelligence training platform, a retrieval thread;

S22, determining, upon completion of each retrieval, whether a retrieval times threshold is met;
in response to the retrieval times threshold being met, performing step S23; and
in response to the retrieval times threshold being not met, performing step S24;
S23, determining whether the retrieval task is completed;
in response to the retrieval task being completed, performing step S28; and
in response to the retrieval task being not completed, performing step S25;
S24, continuing retrieval, and returning to step S22;
S25, returning retrieval content, pausing the retrieval, and determining whether a total retrieval duration exceeds a retrieval duration threshold;
in response to the total retrieval duration exceeding the retrieval duration threshold, performing step S26; and
in response to the total retrieval duration not exceeding the retrieval duration threshold, performing step S27;
S26, determining that the retrieval times out, and ending the retrieval;
S27, waking up the retrieval, and returning to the step S24; and
S28, returning the retrieval content, and ending the retrieval.

15. The device according to claim 14, wherein step S1 of setting the artificial intelligence training platform to acquire a retrieval task issued by a user comprises:
setting the artificial intelligence training platform to acquire a login token of the user; and
setting the artificial intelligence training platform to receive the retrieval task issued by the user based on the token.

16. The device according to claim 15, wherein the step S22 of determining, upon completion of each retrieval, whether a retrieval times threshold is met, comprises:
determining, upon completion of each retrieval, whether there is a next retrieval task issued by a user with the same token;
in response to there being the next retrieval task issued by the user with the same token, interrupting a current retrieval task thread, and performing operations based on a type of the next retrieval task; and
in response to there not being the next retrieval task issued by the user with the same token, determining whether the retrieval times threshold is met;
determining whether an interruption of the current retrieval task thread times out;
in response to the interruption of the current retrieval task thread timing out, determining that a retrieval interruption times out, and ending the retrieval; and
in response to the interruption of the current retrieval task thread not timing out, waiting for completion of the next retrieval task, and returning to determine whether an interruption of the current retrieval task thread times out; and
determining whether the retrieval times threshold is met;
in response to the retrieval times threshold being met, determining whether the retrieval task is completed; and
in response to the retrieval times threshold being not met, continuing retrieval, and returning to determine, upon completion of each retrieval, whether a retrieval times threshold is met.

17. The device according to claim 16, wherein the interrupting the current retrieval task thread, and performing operations based on the type of the next retrieval task, comprises:
determining the type of the next retrieval task;
in response to the type of the next retrieval task being a covering retrieval, regarding the next retrieval task as a new retrieval task, and returning to set the artificial intelligence training platform to start a retrieval thread;
in response to the type of the next retrieval task being a queued retrieval, setting the next retrieval task to a wait queue, continuing retrieval, and returning to determine, upon completion of each retrieval, whether a retrieval times threshold is met;
in response to the type of the next retrieval task being a pause retrieval, returning retrieval content, pausing the retrieval, and determining whether a total retrieval duration exceeds a retrieval duration threshold;
in response to the type of the next retrieval task being a continued retrieval, continuing retrieval, and returning to determine, upon completion of each retrieval, whether a retrieval times threshold is met; and
in response to the type of the next retrieval task being a terminate retrieval, returning the retrieval content, and ending the retrieval.

18. The device according to claim 14, wherein step S3 of setting the artificial intelligence training platform to perform sequential encoding on files in a database in units of folders to generate ordered queue folders, extract a retrieval keyword from the retrieval task, and perform keyword retrieval on each ordered queue folder by combining a binary search and depth-first traversal, comprises:
setting the artificial intelligence training platform to perform sequential encoding on the files in the database in units of folders by hash to generate incremental or decremental queue folders;
setting the artificial intelligence training platform to extract the retrieval keyword from the retrieval task, and locating a queue folder;
setting the artificial intelligence training platform to determine a traversal depth based on the retrieval keyword and a located queue folder before traversal retrieval, and determine a traversal path by binary search based on the traversal depth;
setting the artificial intelligence training platform to perform the traversal retrieval in the located queue folder along the traversal path, and determine, upon completion of the traversal retrieval, whether all the queue folders are traversed;
in response to all the queue folders being traversed, returning the retrieval content, and ending the retrieval; and
in response to not all the queue folders being traversed, locating to a next queue folder, and setting the artificial intelligence training platform to determine a traversal depth based on the retrieval keyword and a located queue folder before traversal retrieval, and determining a traversal path by binary search based on the traversal depth.

\* \* \* \* \*